(12) United States Patent
Kim et al.

(10) Patent No.: US 10,378,670 B2
(45) Date of Patent: Aug. 13, 2019

(54) SOLENOID VALVE HAVING VENTILATION STRUCTURE

(71) Applicant: HYUNDAI KEFICO CORPORATION, Gunpo, Gyeonggi-do (KR)

(72) Inventors: Hyung Jun Kim, Gyeonggi-do (KR); Young Keun Kim, Incheon (KR); Ho Yeon Kim, Gyeonggi-do (KR); Byung Sam So, Gyeonggi-do (KR); Dong Ryul Lee, Gyeonggi-do (KR)

(73) Assignee: HYUNDAI KEFICO CORPORATION, Gunpo, Gyeonggi-do (KR)

( * ) Notice: Subject to any disclaimer, the term of this patent is extended or adjusted under 35 U.S.C. 154(b) by 412 days.

(21) Appl. No.: 15/348,239

(22) Filed: Nov. 10, 2016

(65) Prior Publication Data

US 2017/0059056 A1    Mar. 2, 2017

Related U.S. Application Data

(63) Continuation of application No. PCT/KR2015/005943, filed on Jun. 12, 2015.

(30) Foreign Application Priority Data

Jun. 12, 2014   (KR) .................. 10-2014-0071645
Jun. 20, 2014   (KR) .................. 10-2014-0075421

(51) Int. Cl.
*F16K 31/06*   (2006.01)
*H01F 7/06*    (2006.01)
(Continued)

(52) U.S. Cl.
CPC .......... *F16K 31/0675* (2013.01); *F16K 11/07* (2013.01); *F16K 27/041* (2013.01); *F16K 31/0613* (2013.01); *F16K 49/00* (2013.01); *H01F 7/06* (2013.01); *H01F 7/121* (2013.01); *F16H 2061/0253* (2013.01)

(58) Field of Classification Search
CPC .......... H01F 27/325; H01F 7/121; H01F 7/06; F16K 31/0675; F16K 49/00; F16K 11/07; F16K 31/0613; F16K 27/041; F16H 2061/0253
See application file for complete search history.

(56) References Cited

U.S. PATENT DOCUMENTS

| | | | | |
|---|---|---|---|---|
| 4,728,916 A | * | 3/1988 | Fontecchio | ............... H01F 5/04 335/255 |
| 8,487,733 B2 | * | 7/2013 | Chu | ........................ H01F 3/10 336/212 |
| 2014/0318649 A1 | * | 10/2014 | So | ....................... F16K 31/0668 137/599.14 |

FOREIGN PATENT DOCUMENTS

EP   1582791 A1   10/2005
JP   2005-282754 A   10/2005
(Continued)

*Primary Examiner* — Mohamad A Musleh
(74) *Attorney, Agent, or Firm* — Mintz Levin Cohn Ferris Glovsky and Popeo, P.C.; Kongsik Kim; Jhongwoo Jay Peck

(57) ABSTRACT

A solenoid valve is provided. The solenoid valve is used to control the flow of fluid in various technical fields and products including a transmission installed in a vehicle. The solenoid valve includes a ventilation passage connecting in flow communication the interior and exterior of an operating chamber, configured to operate an armature.

15 Claims, 9 Drawing Sheets

(51) Int. Cl.
*F16K 11/07* (2006.01)
*F16K 27/04* (2006.01)
*H01F 7/121* (2006.01)
*F16K 49/00* (2006.01)
*F16H 61/02* (2006.01)

(56) References Cited

FOREIGN PATENT DOCUMENTS

| | | |
|---|---|---|
| JP | 2005-308161 A | 11/2005 |
| JP | 2006-307984 A | 11/2006 |
| JP | 2009-281453 A | 12/2009 |
| JP | 2010-151165 A | 7/2010 |
| JP | 2012-241733 A | 12/2012 |
| KR | 10-0923436 B1 | 10/2009 |

* cited by examiner

SOLENOID VALVE HAVING VENTILATION STRUCTURE

CROSS-REFERENCE TO RELATED APPLICATIONS

This is a continuation application of International Application No. PCT/KR2015/005943 filed Jun. 12, 2015, which claims priority, under 35 U.S.C. § 119, to Korean Application No. 10-2014-0071645 filed Jun. 12, 2014 and Korean Application No. 10-2014-0075421 filed Jun. 20, 2014. The applications are incorporated herein by reference in its entirety

BACKGROUND

Field of the Disclosure

An exemplary embodiment of the present disclosure relate to a solenoid valve and more particularly to a solenoid valve used to control the flow of fluid in various technical fields and products, such as a transmission installed in a vehicle.

Description of the Related Art

Recently, studies have been actively conducted with the goal of reducing the weight and cost of transmission solenoid valves for automatic control. A solenoid valve is a device for opening and closing a passage using an armature, which is operated by a solenoid magnetic field, when electric power is applied to the solenoid valve.

Typically, the solenoid valve includes a valve body which has an input port, a control port, etc., a spool which rectilinearly actuates in the valve body, an armature configured to actuate the spool, a coil configured to generate a solenoid magnetic field to actuate the armature, and a magnetic member which provides the solenoid magnetic field generated by the coil to form a magnetic path. The armature is typically installed to reciprocate in an operating chamber formed in a magnetic core. The operating chamber is filled with a fluid (e.g., air or oil). In order to rapidly control the flow of fluid, the armature rapidly moves in response to the generation of the solenoid magnetic field.

The matters disclosed in this section are merely for enhancement of understanding of the general background of the disclosure and should not be taken as an acknowledgment or any form of suggestion that the matters form the related art already known to a person skilled in the art.

SUMMARY

The present disclosure provides a solenoid valve having a ventilation structure. A solenoid valve may include a vent passage through which an interior and an exterior of an operating chamber, in which an armature is operated, communicate with each other. For example, when an armature is configured to move from one side to the other in an operating chamber, negative pressure may be formed at the one side when fluid is not rapidly introduced therein. The negative pressure may impede a rapid responsive movement of the armature. In order to prevent such a phenomenon in the operating chamber, a ventilation structure which allows the operating chamber to communicate with an exterior may be used. The ventilation structure may be formed to preclude introduce foreign substances into the operating chamber through the ventilation structure. In other words, the ventilation structure may be formed to provide for a fluid to flow easily therethrough in order to secure the rapid response of the armature. In addition, the ventilation structure may include a structure that prevents foreign substances from flowing into the operating chamber.

The solenoid valve may include a valve body, a coil, a pole core, an armature, and a bobbin. The valve body may have a plurality of ports and passages through which the ports communicate with each other. The coil may be configured to generate a solenoid magnetic field when electric power is supplied thereto. The pole core may form a magnetic path of the solenoid magnetic field, and may have an operating chamber disposed therein. The armature may be disposed within the operating chamber, and may be rectilinearly actuated (e.g., moved) by the solenoid magnetic field.

The bobbin may enclose at least a portion of the pole core, and may include a cylindrical bobbin body and first and second flanges formed at both ends of the bobbin body. The coil may be disposed to be wound external to the bobbin body, and the pole core may be inserted and installed in the bobbin body. The second flange of the bobbin may have an aperture through which the operating chamber communicates with an exterior of the bobbin body.

Further, a circumferential passage may be formed in a face of the first or second flange. The circumferential passage may be connected to an aperture formed in the first or second flange and to a radial passage that may be radially formed therein. When the circumferential passage is formed in the first flange, a fluid introduced from the exterior of the bobbin body through the aperture of the first flange may be discharged out of a housing after circumferentially flowing through the circumferential passage of the first flange and then passing through the radial passage.

In accordance with the present disclosure, foreign substances may be prevented from flowing into an operating chamber and to secure a more improved response of an armature by allowing the interior of the operating chamber to communicate with the exterior.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
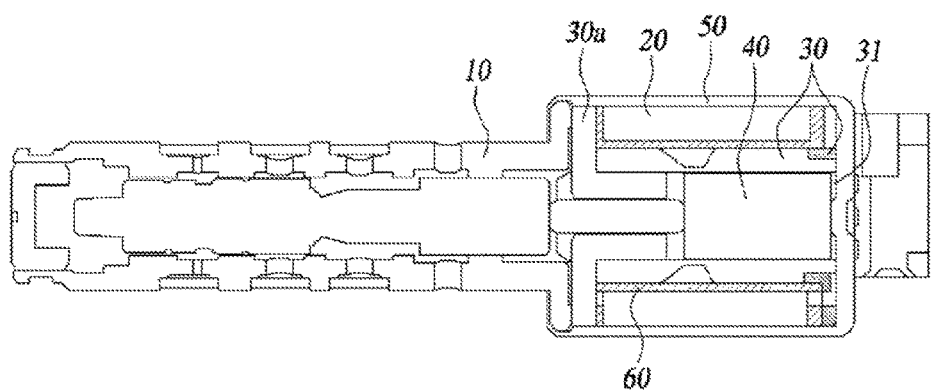
FIG. 1 is an exemplary view illustrating a solenoid valve according to an exemplary embodiment of the present disclosure.

Exemplary embodiments of the present disclosure will be described below in more detail with reference to the accompanying drawings. The present disclosure may, however, be embodied in different forms and should not be construed as limited to the embodiments set forth herein. Advantages and features of the present disclosure and methods for achieving the same will be clearly understood with reference to the following detailed description of embodiments in conjunction with the accompanying drawings. However, the present disclosure is not limited to the embodiments disclosed herein, but may be implemented in various different forms. The embodiments are merely given to make the disclosure of the present disclosure complete and to completely instruct the scope of the disclosure to those skilled in the art, and the present disclosure should be defined by the scope of the claims.

Throughout the disclosure, like reference numerals refer to like parts throughout the various figures and embodiments of the present disclosure. In certain embodiments, detailed descriptions of relevant constructions or functions well known in the art may be omitted to avoid obscuring appreciation of the disclosure. The drawings are not necessarily to scale and in some instances, proportions may have been exaggerated in order to clearly illustrate features of the embodiments. The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

FIG. 1 is an exemplary view illustrating a solenoid valve according to an exemplary embodiment of the present disclosure. Referring to FIG. 1, the solenoid valve, which is designated by reference numeral 1, according to the exemplary embodiment of the present disclosure may include a valve body 10, a coil 20, a pole core 30, a core plate 30a, an armature 40, a housing 50, and a bobbin 60. The valve body 10 may have a plurality of ports and passages through which the ports communicate with each other. The armature 40 may be disposed to be longitudinally movable to open and close the passage.

The pole core 30 may assist in the formation of the magnetic path of the solenoid magnetic field generated by the coil 20, and may be disposed within the bobbin 60. The pole core 30 may include an operating chamber 31 therein, and the armature 40 may be disposed to be rectilinearly actuated (e.g., movable) in the operating chamber 31. The core plate 30a may aid in the formation of the magnetic path of the solenoid magnetic field generated by the coil 20, similar to the pole core 30. The core plate 30a may include a flange that abuts a flange of the valve body 10 and may be configured to be inserted into and coupled to the pole core 30.

The coil 20 may be installed to be wound around the bobbin 60, and may be configured to generate a solenoid magnetic field by the application of electric power thereto. The housing 50 may enclose the coil 20, and may couple the flange of the valve body 10 to the flange of the core plate 30a to maintain a contact state. The bobbin 60 may be disposed at one side of the valve body 10. The bobbin 60 may include a cylindrical interior portion, and the pole core 30 may be disposed within the bobbin 60. The bobbin 60 may have a passage formed on one surface thereof to absorb variation in the volume of fluid that may be attributed to the movement of the armature 40. A first end of the passage may be configured to communicate with an exterior and a second end thereof may be configured to communicate with the operating chamber 31. The passage may include a passage that may be complicatedly bent. In the embodiment of the present disclosure, the passage may be formed to be complicatedly bent to prevent the introduction of foreign substances contained in the fluid flowing in the passage into the operating chamber 31 when the armature 40 is operated.

Figure 2:
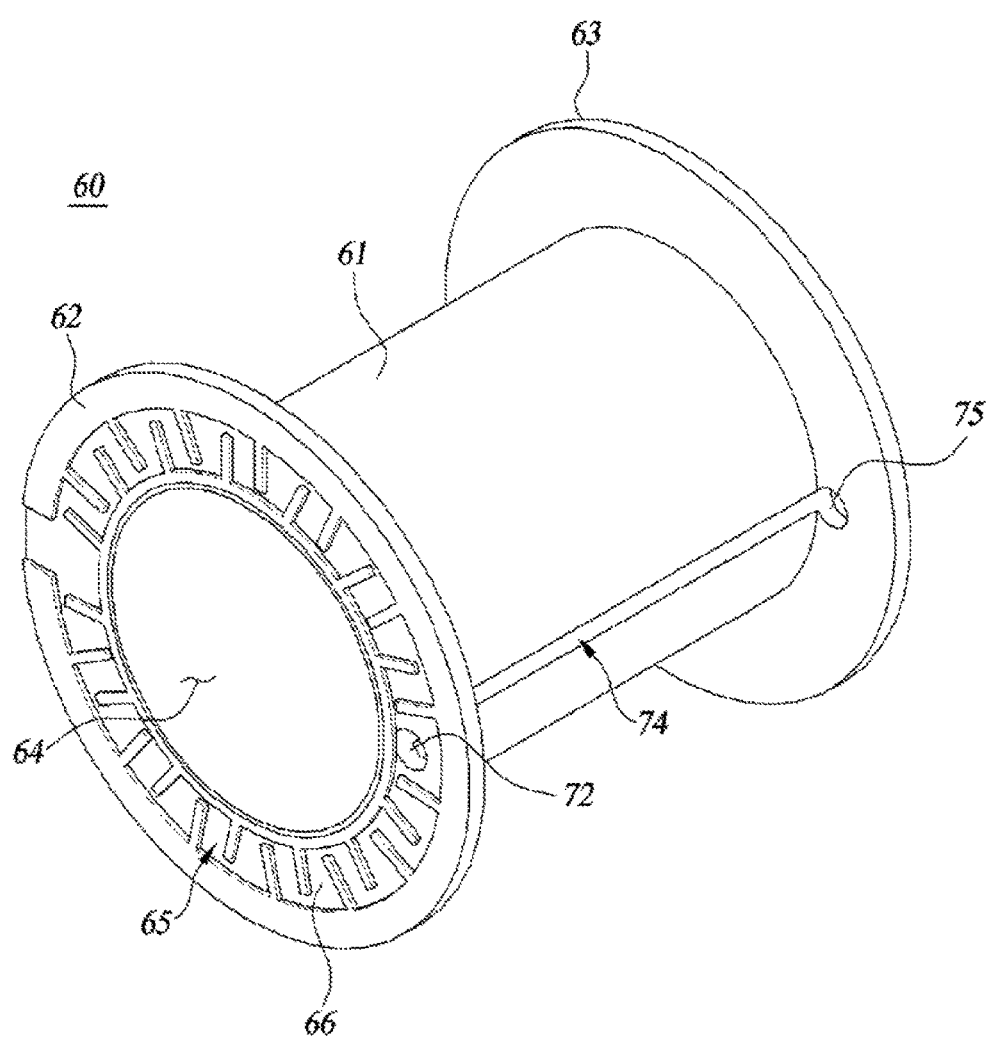
FIG. 2 is an exemplary view illustrating a bobbin installed in the solenoid valve of FIG. 1 according to an exemplary embodiment of the present disclosure.

FIG. 2 illustrates the state of the bobbin. The bobbin will be described below in more detail with reference to FIG. 2. The bobbin 60 may include a bobbin body 61, a first flange 62, and a second flange 63. The coil 20 may be wound around the exterior surface of the bobbin body 61, and the bobbin body 61 may be hollow 64 for installing the pole core 30 therein. The first and second flanges 62 and 63 may be respectively arranged at a first end and a second end of the bobbin body 61. In other words, the first flange 62 may be disposed at the upper end of the bobbin body 61, and the second flange 63 may be disposed at the lower end of the bobbin body 61. The first flange 62 may be disposed adjacent to the valve body 10 while the upper surface of the first flange 62 may abut the lower surface of the flange portion of the core plate 30a. The second flange 63 may be disposed to face the axial interior surface (e.g., the bottom surface) of the housing 50.

A bobbin exterior-surface passage 74 may be formed between the first and second flanges 62 and 63. The bobbin exterior-surface passage 74 may provide a fluid channel that flows between the first and second flanges 62 and 63. For example, the bobbin exterior-surface passage 74 may be a groove formed in the exterior surface of the bobbin body 61 of the bobbin 60, as illustrated in FIG. 2 in the embodiment, may be a gap between the coil 20 and the exterior surface of the bobbin body 61 of the bobbin 60, or may be a gap in a bundle of wound coils 20. However, the present disclosure is not limited thereto.

In addition, a circumferential passage 66 may be formed in a face 65 of the first or second flange 62 or 63. In other words, the circumferential passage 66 may be formed in the face 65 of the first flange 62, or may be formed in the face 65 of the second flange 63. The circumferential passage 66 may be circumferentially formed in the face 65. In the exemplar embodiment, the passage 66 may be provided by forming a stepped portion in the face 65. For example, the stepped portion may be formed by a portion that axially protrudes from the face 65 and a portion that does not protrude therefrom. In particular, the passage 66 may be formed by the close contact between the lower surface of the flange of the core plate 30a and the face 65 in the exemplary embodiment.

Figure 3:
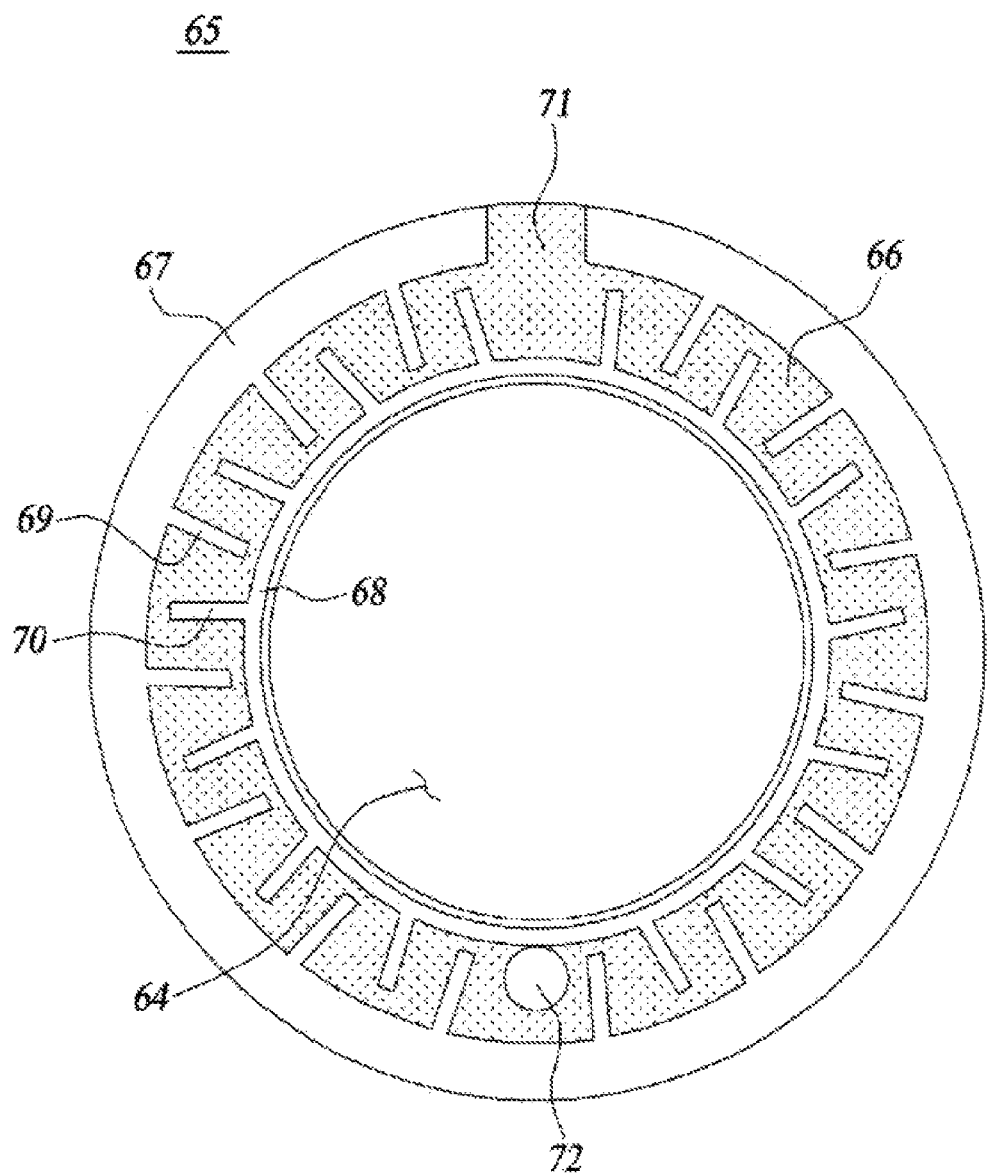
FIG. 3 is an exemplary view illustrating a face of the bobbin of FIG. 2 according to an exemplary embodiment of the present disclosure.

FIG. 3 illustrates the circumferential passage 66 formed in the face 65 of the bobbin 60. The circumferential passage 66 formed in the face 65 of the first flange 62 will be described below in more detail with reference to FIG. 3. The face 65 may include a first circular protruding portion 67 and a second circular protruding portion 68. The passage 66 may be formed between the first and second circular protruding portions 67 and 68. The first circular protruding portion 67 may axially protrude. The second circular protruding portion 68 may axially protrude, similar to the first circular protruding portion 67. The first and second circular protruding portions 67 and 68 may axially protrude to the same dimension or to different dimension. The first and second circular protruding portions 67 and 68 may be coaxially disposed. The second circular protruding portion 68 may have a diameter less than the first circular protruding portion 67. The second circular protruding portion 68 may be disposed adjacent to the hollow 64 of the bobbin 60. The first circular protruding portion 67 may be formed at the edge of the first or second flange 62 or 63.

The passage 66 may be formed to allow a fluid to flow circumferentially along a zigzag path by first and second protruding portions 69 and 70. The first protruding portion 69 may extend from the first circular protruding portion 67, and the second protruding portion 70 and may extend from the second circular protruding portion 68. The first and second protruding portions 69 and 70 may axially protrude from the face, and may protrude to the same dimension or to different dimension. The first protruding portion 69 may extend radially inward from the first circular protruding portion 67, and the second protruding portion 70 may extend radially outward from the second circular protruding portion 68. The first and second protruding portions 69 and 70 may be arranged alternately in the circumferential direction.

The passage 66 may be configured to communicate with an external channel 71 and an internal channel 72. The external channel 71 may be a channel through which, when the armature 40 is actuated (e.g., moves) in a downward direction (in the right direction in FIG. 1), the fluid flowing along the circumferential passage 66 may be circumferentially discharged from the face 65. The fluid discharged through the external channel 71 may be discharged out of the housing after passing between the interior surface of the housing and the side surface (e.g., the circumferential surface) of the flange of the core plate 30a and by passing between the interior surface of the housing and the side surface (e.g., the circumferential surface) of the flange of the valve body 10.

The internal channel 72 may be configured to communicate with the operating chamber 31. In other words, when the armature 40 is actuated (e.g., moved downward), the fluid flowing into the exterior of the bobbin body 61 from the operating chamber may be introduced into the upper surface of the first flange 62 through the internal channel 72. The external or internal channel 71 or 72 may include an aperture or a groove. In FIG. 3, the external channel 71 may be formed as an axially recessed groove, and the internal channel 72 may be formed as aperture.

Figure 4:
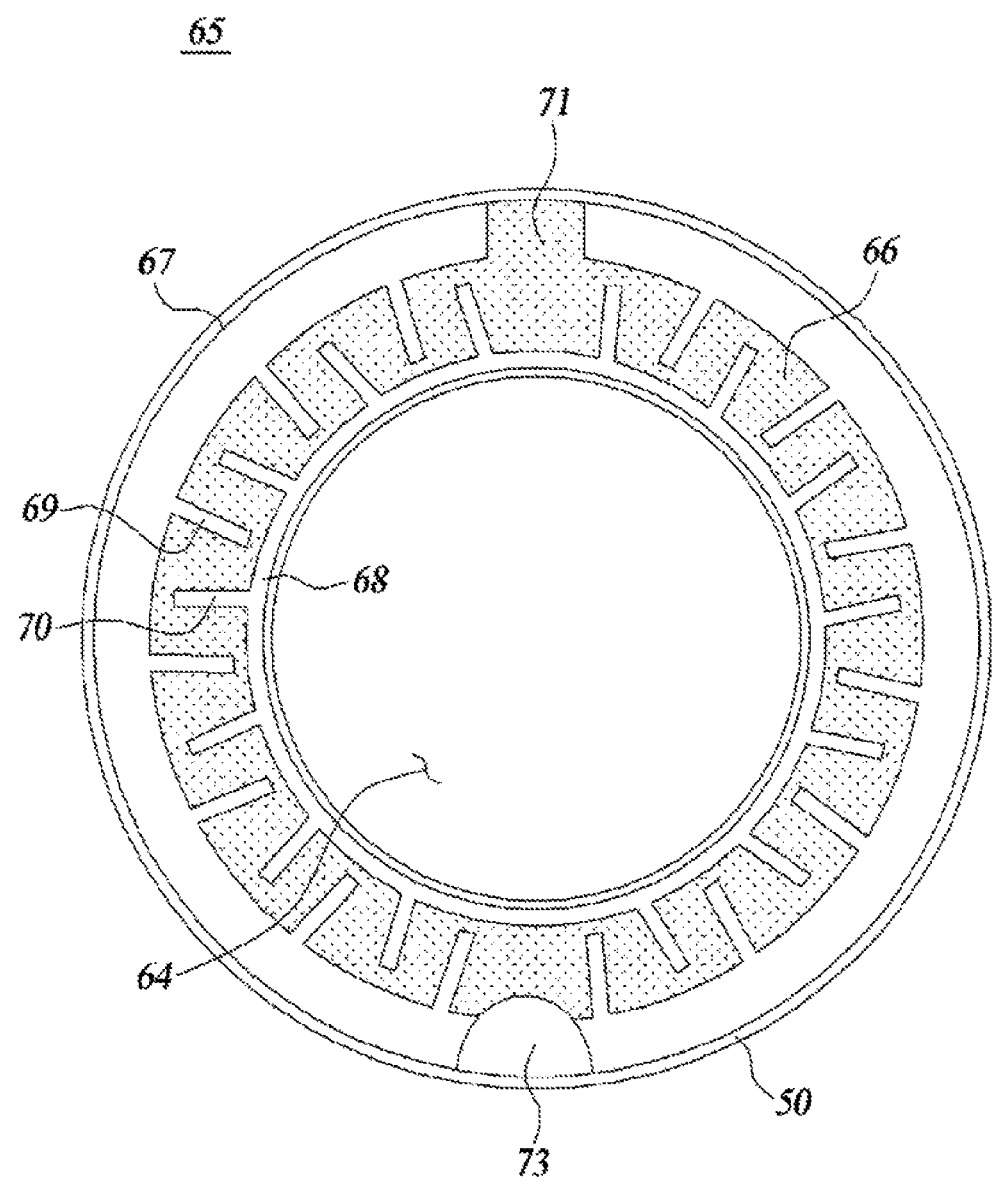
FIG. 4 is an exemplary view illustrating a bobbin face according to an exemplary embodiment of the present disclosure.

FIG. 4 illustrates an internal channel 73 according to exemplary embodiment of the present disclosure. The internal channel will be described below in more detail with reference to FIG. 4. In this exemplary embodiment, the internal channel 73 may be formed as a groove. The groove 73 may be formed by the circumferential surface of a first or second flange 62 or 63 being recessed radially inward at a first or second circular protruding portion 67 or 68. In particular, a fluid may flow through an aperture formed by the groove 73 and the interior surface of a housing 50.

Figure 5:
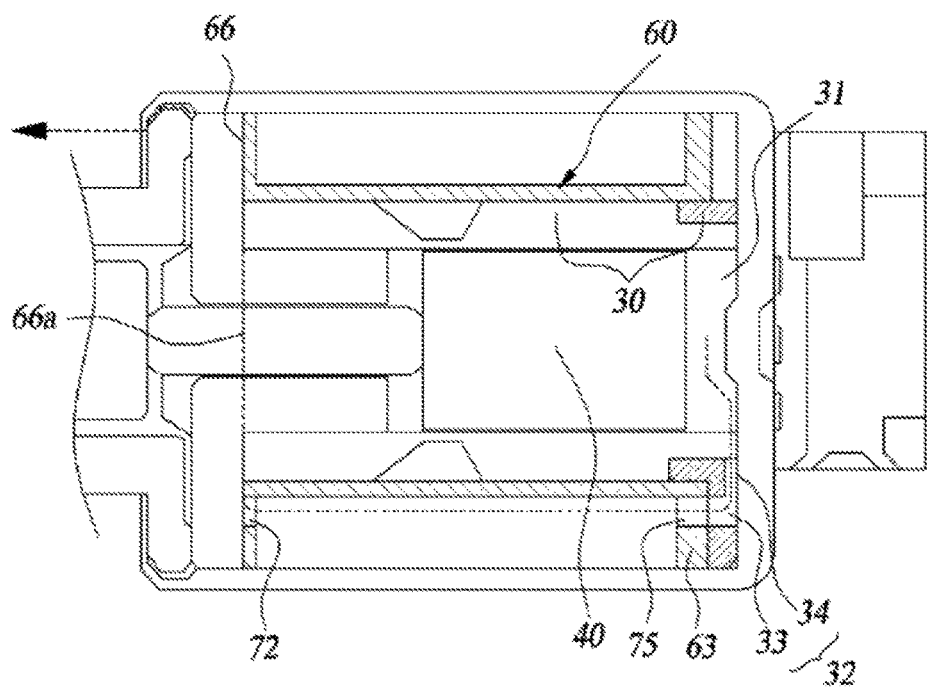
FIG. 5 is an exemplary view illustrating a path in which the fluid in an operating chamber is discharged out of a housing according to an exemplary embodiment of the present disclosure.

FIG. 5 illustrates a first ventilation passage through which the operating chamber 31 communicates with the bobbin 60 and the state in which a fluid is discharged from the operating chamber 31 to the exterior. For example, FIG. 5 illustrates that the circumferential passage 66 may be formed in the first flange 62. A description thereof will be given below with reference to FIG. 5. The pole core 30 may include a ventilation passage 32. The ventilation passage 32 may absorb variation in the volume of fluid, caused by the movement of the armature 40. A first end of the ventilation passage 32 may be in communication with the operating chamber 31 when the armature 40 is installed therein, and a second end thereof may communicate with an exterior through the bobbin 60. The ventilation passage 32 may include a first ventilation passage 33 and a second ventilation passage 34. The first ventilation passage 33 may include an axially formed passage, and the second ventilation passage 34 may include a radially formed passage.

The first end of the first ventilation passage 33 may be in communication with the bobbin 60. Specifically, the first end of the first ventilation passage 33 may be in communication with an aperture 75 formed in the second flange 63 of the bobbin 60. The second end of the first ventilation passage 33 may be in communication with the first end of the second ventilation passage 34. The second end of the second ventilation passage 34 may be in communication with the operating chamber 31, which is the space in which the armature 40 is operated. In particular, for the pole core 30 to communicate with the interior of the operating chamber 31, the pole core 30 may include a passage such as a rectilinear passage 120 illustrated in FIG. 9, a description of which will be given later. The fluid flowing out of the operating chamber 31 may reach the internal channel 72, which communicates with the circumferential passage 66, after sequentially passing through the second ventilation passage 34, the first ventilation passage 33, and the aperture 75 formed in the second flange 63 of the bobbin 60, and then passing through the bobbin exterior-surface passage 74 that may be formed between the first flange 62 and the second flange 63.

Figure 6:
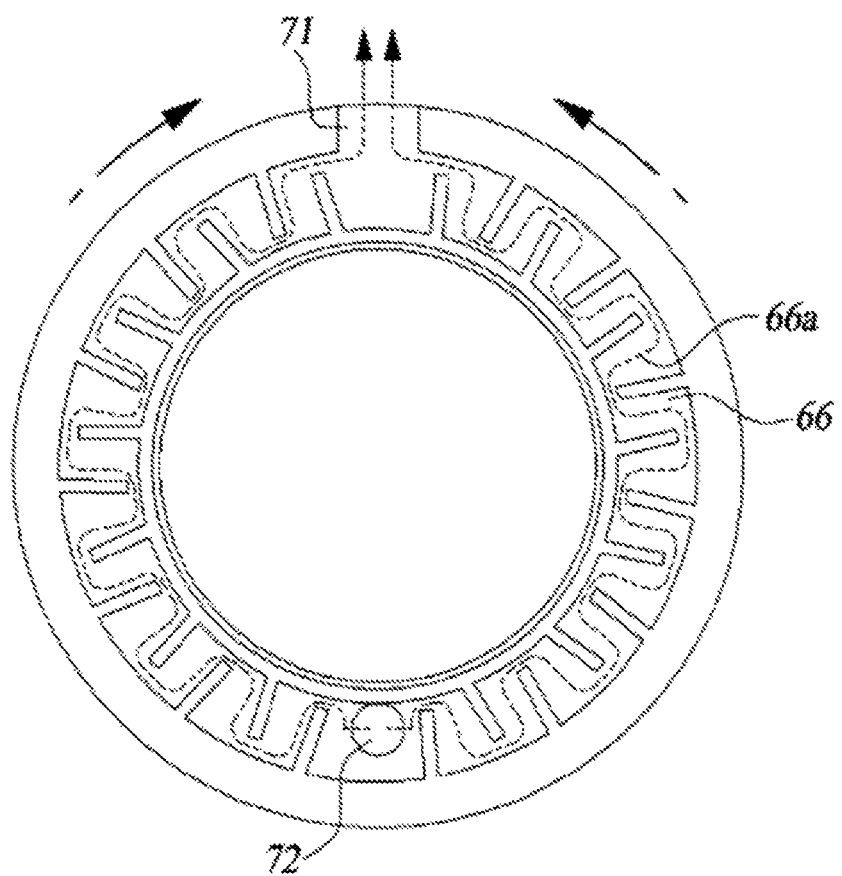
FIG. 6 is an exemplary view illustrating a state in which a fluid circumferentially flows along a passage according to an exemplary embodiment of the present disclosure.

Further, FIG. 6 illustrates when a fluid passes through the circumferential passage 66. The path along which a fluid flows through the ventilation structure according to the exemplary embodiment will be described below with reference to FIGS. 5 and 6. For example, when the armature 40 moves to the right in FIG. 5, the fluid in the operating chamber 31 may be discharged out of the housing after sequentially passing through the second ventilation passage 34, the first ventilation passage 33, the aperture 75 of the second flange 63, the bobbin exterior-surface passage 74, the internal channel 72 of the first flange 62, the circumferential passage 66 of the first flange 62, and the external channel 71 of the first flange 62. In particular, when the fluid passes through the passage 66, the fluid may flow, for example, in a square wave form 66a due to the complicated shape of the passage 66 (see FIG. 6).

Since the external and internal channels 71 and 72 may be arranged in opposite directions on the basis of a central axis in the exemplary embodiment, the fluid passing through the internal channel 72 may be divided into clockwise and counterclockwise directions and may be moved to the external channel 71 (see FIG. 6). In addition, the channel through which the external channel 71 and the exterior of the solenoid valve 1 communicate with each other may be a gap or a groove that may be formed between the valve body 10 and the housing 50 based on the exemplary embodiment.

Furthermore, when the armature 40 is moved in the opposite direction, the pressure may be reduced in the right space of the armature 40, which is within the space of the operating chamber 31. Consequently, fluid may be introduced into the operating chamber 31 from the exterior through the circumferential passage 66 of the first flange 62, the bobbin exterior-surface passage 74, the second flange 63, the first ventilation passage 33, and the second ventilation passage 34. In other words, since the introduction path of the fluid has a long length and a large number of bent portions, the introduction of foreign substances may be prevented. In particular, the effect of preventing the introduction of foreign substances may be significantly increased due to the complicated path shape of the passage 66.

Figure 7:
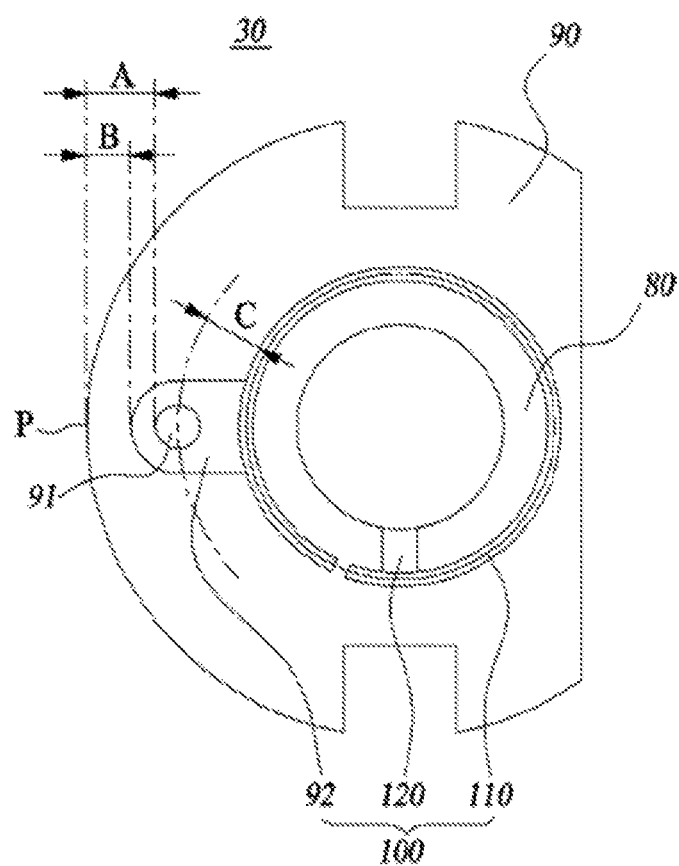
FIG. 7 is an exemplary view illustrating a pole core according to an exemplary embodiment of the present disclosure.

A pole core according to an exemplary embodiment of the present disclosure will be described below with reference to FIGS. 7 to 9. In the exemplary embodiment, a ventilation passage may include a first ventilation passage 91 and a second ventilation passage 100. A first end of the first ventilation passage 91 may be in communication with a aperture 75 formed in a bobbin 60. A second end of the first ventilation passage 91 may be in communication with the second ventilation passage 100. In other words, the first ventilation passage 91 may connect the second ventilation passage 100 to a passage formed in the bobbin 60.

A first end of the second ventilation passage 100 may communicate with the first ventilation passage 91, and a second end thereof may communicate with an operating chamber 31 in which an armature 40 is placed. In other words, the second ventilation passage 100 may allow the first ventilation passage 91 to communicate with the operating chamber 31. The first ventilation passage 91 may include a circular aperture 91, but the aperture may have a triangular shape, a quadrangular shape, a polygonal shape, or the like. The first ventilation passage 91 may be formed in an axial direction, but may be formed to be inclined from the axial direction.

The first ventilation passage 91 may be formed at a position spaced radially inward from the end P of the maximum diameter portion of a pole core 30 by a distance A. The pole core 30 may include a flange which protrudes radially outward. The first ventilation passage 91 may pass through a first surface of the flange and a second surface thereof. A housing 50 may have an aperture in which a connection terminal serving to, for example, electrically connect a coil 20 to a contact fork is installed. In the exemplary embodiment, the first ventilation passage 91 may prevent the introduction of foreign substances through the aperture formed in the housing 50.

The second ventilation passage 100 may include a first rectilinear passage 92, a second rectilinear passage 120, and a curved passage 110. One end of the first rectilinear passage 92 may be in communication with the first ventilation passage 91, and a second end thereof may be in communication with a curved passage 110. A first end of the second rectilinear passage 120 may be in communication with the operating chamber 31 with the armature 40 disposed therein, and the second end thereof may communicate with the first rectilinear passage 92. One end of the curved passage 110 may communicate with the first rectilinear passage 92, and a second end thereof may communicate with the second rectilinear passage 120.

The pole core 30 may have a first surface which axially faces and contacts the interior surface 52a of the housing 50. The first rectilinear passage 92, the second rectilinear passage 120, and the curved passage 110 may be defined between the interior surface 52a of the housing 50 and a surface of the pole core 30. For example, the interior surface 52a of the housing 50 may refer to an interior surface 52a of a closing portion 52 of the housing 50. In other words, the first and second rectilinear passages 92 and 120, may be formed as recessed grooves, and the curved passage 110, may be formed as a groove by chamfers 82 and 93 to be described later, may be formed in one surface of the pole core 30. The remaining portion of the pole core 30 may axially face and contact the interior surface 52a of the housing 50. Accordingly, no passage is formed in the portion of the pole core other than the grooves, and the first and second rectilinear passages 92 and 120 and the curves passage 110 may be defined by the grooves forming them and the interior surface 52a of the housing 50.

The second ventilation passage 100 will be described in more detail. The first rectilinear passage 92 may include a stepped recess portion 92 recessed into one surface of the pole core 30 in the direction moving away from the interior surface 52a. The stepped recess portion 92 may be connected to a second end of the first ventilation passage 91. In other words, the aperture 91 may be formed in the stepped recess portion 92. The first rectilinear passage 92 may be provided by the stepped recess portion 92 and the interior surface 52a of the closing portion 52 of the housing 50. The stepped recess portion 92 may be formed at a position spaced radially inward from the outermost portion of one surface of the pole core 30 by a distance B. The fluid, may be discharged from the operating chamber 31 and may flow in the first rectilinear passage 92, is not moved to the outermost portion of the pole core 30, but is introduced into the first ventilation passage 91 by switching the flow direction thereof along the way.

Since the remaining portion of one surface of the pole core 30, except for the stepped recess portion 92, may be in contact with the interior surface 52a of the closed portion 52 of the housing 50, a gap for the flow of fluid is not formed therebetween. Additionally, a fluid may flow in the first rectilinear passage 92, formed by the stepped recess portion 92 and the interior surface 52a of the closed portion 52, and may be introduced into the aperture 91 formed in the stepped recess portion 92 before being moved to the outermost portion of the pole core 30. Through the structure in which the pole core 30 has the stepped recess portion 92, it foreign substances may be prevented from being introduced into the pole core 30 through various apertures formed in the closing portion 52 of the housing 50.

The curved passage 110 may be circumferentially formed in one surface of the pole core 30. The curved passage 110 may be formed at a position that is spaced radially inward from the first ventilation passage 91 by a distance C. In other words, the first ventilation passage 91 and the curved passage 110 may be sequentially spaced radially inward from the outermost portion of one surface of the pole core 30, the first rectilinear passage 92 may be formed between the first ventilation passage 91 and the curved passage 110, and the second rectilinear passage 120 may be formed between the curved passage 110 and the operating chamber 31. In the exemplary embodiment, the pole core 30 may be formed by coupling a core 80 with a pole 90. In particular, the second rectilinear passage 120 may be radially formed in a surface of the core 80. The first rectilinear passage 92 may be radially formed in a surface of the pole 90.

Figure 8:
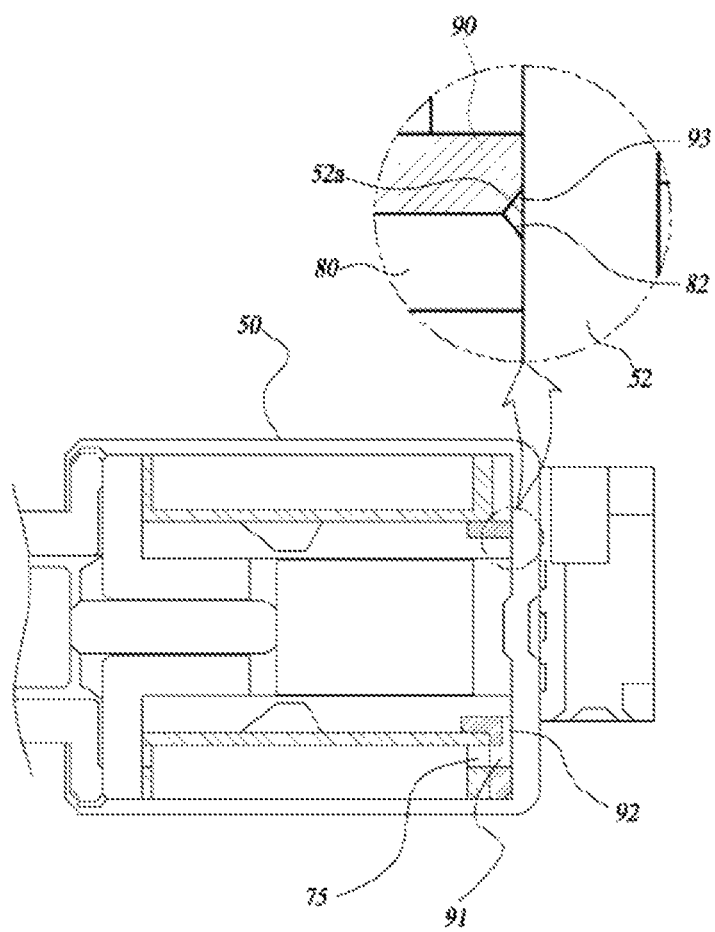
FIG. 8 is an exemplary cross-sectional view illustrating the structure of a passage formed in the pole core of FIG. 7 according to an exemplary embodiment of the present disclosure.

As illustrated in FIG. 8, the curved passage 110 may be formed by the chamfers 82 and 93 which are respectively formed at adjacent corners of the core 80 and the pole 90. In other words, the chamfer 82 may be formed at the corner connecting a first surface and the exterior circumferential surface of the core 80, and a second chamfer 93 may be formed at the corner connecting a second surface and the interior circumferential surface of the pole 90. The curved passage 110 may be enclosed by the chamfer 82 formed on the core 80, the chamfer 93 formed on the pole 90, and the interior surface 52*a* of the housing 50.

Figure 9:
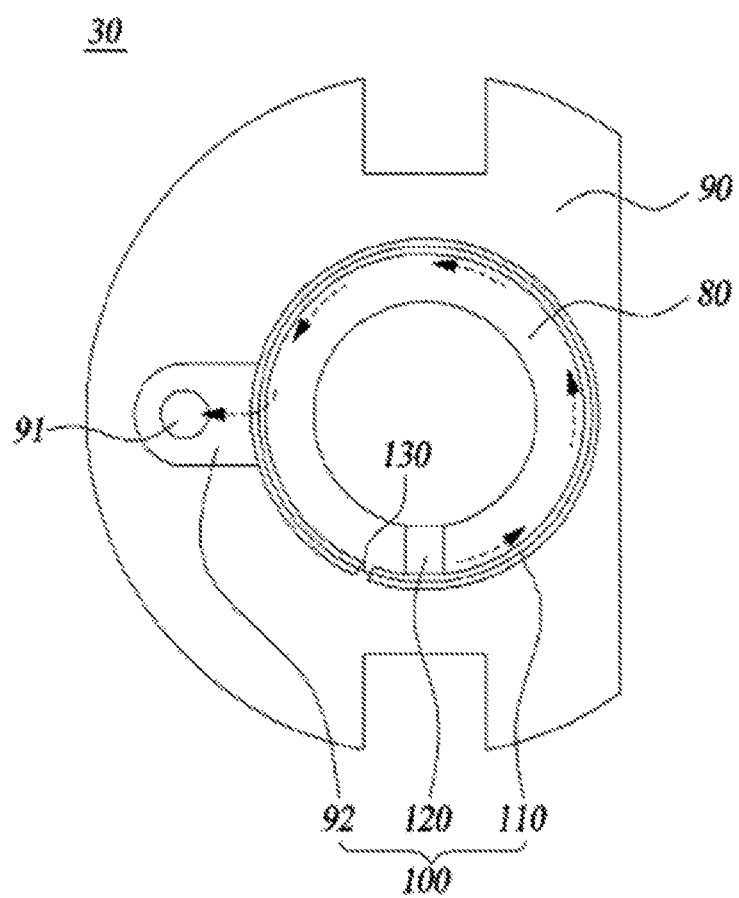
FIG. 9 is an exemplary view illustrating a state in which the fluid discharged from an operating chamber flows along the passage in the pole core according to an exemplary embodiment of the present disclosure.

FIG. 9 illustrates the movement path of fluid. For example, when the armature 40 moves to the closing portion 52 of the housing 50 in the operating chamber 31, the fluid in the operating chamber may be discharged to the exterior after sequentially passing through the second rectilinear passage 120, the curved passage 110, the first rectilinear passage 92, the first ventilation passage 91, and the bobbin 60. In addition, when the armature 40 moves in the direction moving away from the closing portion 52 of the housing 50, the pressure in the operating chamber 31 may be reduced. Consequently, fluid may be introduced into the operating chamber 31 from the exterior through the bobbin 60, the first ventilation passage 91, the first rectilinear passage 92, the curved passage 110, and the second rectilinear passage 120. In other words, when the fluid flows in the curved passage 110, the fluid may flow along a long path of the curved passage 110.

In other words, a flow prevention bump 130 may be formed at a short path of the curved passage 110 to prevent the fluid from flowing along the short path. For example, the flow prevention bump 130 may be formed at both facing portions of the core 80 and the pole 90. Namely, the long path of the flow passage, may prevent the introduction of foreign substances from the exterior. In FIG. 8, the chamfers 82 and 93 may be formed at the end corner of the core 80 and the corner of the pole 90, respectively. The flow prevention bump 130 may be provided in such a manner that the chamfer 82 or 93 is not formed at a portion of the corners. Exemplary embodiments of the present disclosure relate to a solenoid valve. The solenoid valve may be used to control the flow of fluid in various technical fields and products that include a transmission installed in a vehicle.

Although an exemplary embodiment of the present invention has been described for illustrative purposes, those skilled in the art will appreciate that various modifications, additions and substitutions are possible, without departing from the scope and spirit of the invention as disclosed in the accompanying claim

The invention claimed is:

1. A solenoid valve comprising:
   a valve body having a plurality of ports and passages through which the ports communicate with each other;
   a coil generating a solenoid magnetic field when electric power is supplied thereto;
   a pole core forming a magnetic path of the solenoid magnetic field, and having an operating chamber disposed therein;
   an armature disposed within the operating chamber and configured to be actuated by the solenoid magnetic field; and
   a bobbin having a cylindrical bobbin body, a first flange formed at a first end of the bobbin body, and a second flange formed at a second end of the bobbin body, the coil being disposed external to the bobbin body, the pole core configured to be inserted and indisposed within the bobbin body, the second flange having an aperture through which the operating chamber communicates with an exterior of the bobbin body,
   wherein the first flange of the bobbin has an aperture, and a circumferential passage connected to the aperture is formed in a face of the first flange.

2. The solenoid valve according to claim 1, wherein the bobbin body includes a passage groove formed on an exterior circumferential surface thereof, and the passage groove is connected to the aperture of the second flange.

3. The solenoid valve according to claim 1, wherein the face of the first flange has a first circular protruding portion that axially protrudes, and a second circular protruding portion that axially protrudes, similar to the first circular protruding portion, the second circular protruding portion having a smaller diameter than the first circular protruding portion, and the circumferential passage is formed between the first and second circular protruding portions.

4. The solenoid valve according to claim 3, wherein the face of the first flange has a first protruding portion that extends radially outward from the first circular protruding portion, and a second protruding portion that extends radially inward from the second circular protruding portion.

5. The solenoid valve according to claim 1, wherein the first flange has an outlet formed at a radial end and is configured to guide a fluid that flows along the circumferential passage in a radial and outward direction.

6. The solenoid valve according to claim 1, wherein the pole core has a ventilation passage that connects the operating chamber and the aperture of the second flange of the bobbin.

7. The solenoid valve according to claim 6, wherein the ventilation passage includes a first ventilation passage having an aperture formed in a flange of the pole core to provide communication with the aperture of the second flange of the bobbin, and a second ventilation passage to provide fluid communication between the first ventilation passage and the operating chamber.

8. The solenoid valve according to claim 7, wherein the first ventilation passage is formed at a position that is spaced radially inward from an end of a maximum diameter portion of the pole core.

9. The solenoid valve according to claim 7, wherein the second ventilation passage includes a first rectilinear passage in communication with the first ventilation passage, a second rectilinear passage in communication with the operating chamber, and a curved passage that provides the first rectilinear passage to be in communication with the second rectilinear passage.

10. The solenoid valve according to claim 9, further comprising:
a housing with the coil disposed therein,
wherein the pole core has a first surface that axially faces and abuts an interior surface of the housing, and the first and second rectilinear passages and the curved passage are provided by the interior surface of the housing and the first surface of the pole core.

11. The solenoid valve according to claim 10, wherein the first rectilinear passage includes a stepped recess portion recessed in the first surface of the pole core in a direction moving away from the interior surface.

12. The solenoid valve according to claim 11, wherein a second end of the first ventilation passage is connected to the stepped recess portion.

13. The solenoid valve according to claim 9, wherein the curved passage is formed at a position that is spaced radially inward from the first ventilation passage.

14. The solenoid valve according to claim 9, wherein the pole core has a cylindrical core configured to guide the armature, and a pole that extends radially outward while a first end of the core is inserted into and coupled to the pole, and the curved passage is provided by chamfers which are respectively formed at adjacent corners of the core and the pole.

15. A solenoid valve comprising:
a valve body having a plurality of ports and passages through which the ports communicate with each other;
a coil configured to generate a solenoid magnetic field when electric power is supplied thereto;
a magnetizable body forming a magnetic path of the solenoid magnetic field, and having an operating chamber and at least one flange;
an armature disposed within the operating chamber and configured to be actuated by the solenoid magnetic field;
a bobbin having a cylindrical bobbin body, a first flange formed at a first end of the bobbin body, and a second flange formed at a second end of the bobbin body and having an aperture, the coil disposed on the exterior of the bobbin body, the magnetizable body being inserted and installed in the bobbin body;
a housing that coupled the magnetizable body to the valve body and encloses the coil; and
a ventilation passage having a circumferential passage connected to the aperture and circumferentially formed in a face of the first flange of the bobbin, and having an aperture formed in at least one of the flange of the magnetizable body and the second flange of the bobbin, the ventilation passage allowing an interior space in the operating chamber to communicate with an exterior of the housing therethrough.

\* \* \* \* \*